May 8, 1951            T. THOMPSON            2,552,074
VEHICLE REARVIEW MIRROR SUPPORT
Filed April 8, 1948
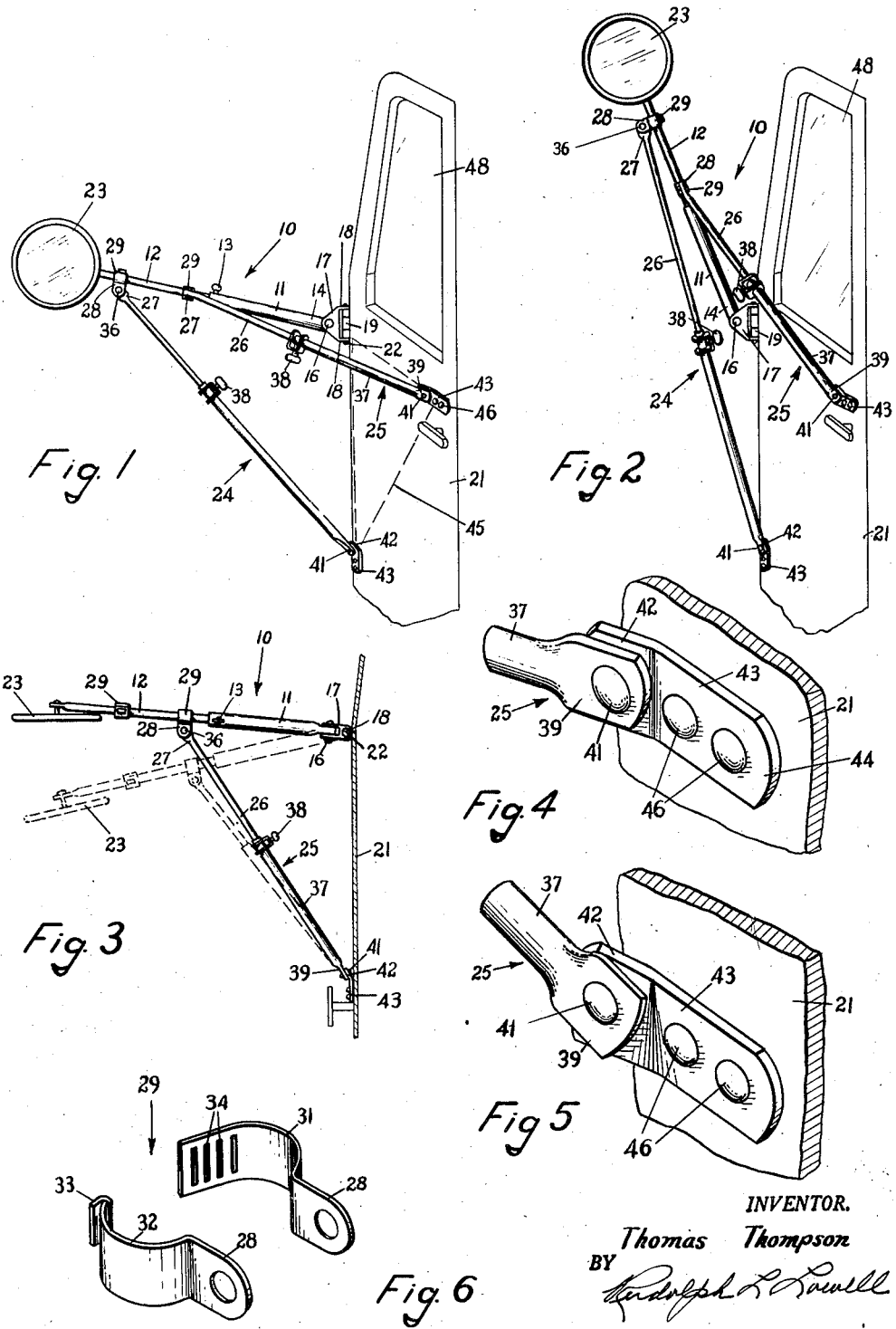
INVENTOR.
Thomas Thompson Patented May 8, 1951

2,552,074

UNITED STATES PATENT OFFICE 2,552,074

VEHICLE REARVIEW MIRROR SUPPORT

Thomas Thompson, Des Moines, Iowa

Application April 8, 1948, Serial No. 19,712

4 Claims. (Cl. 248—279)

This invention relates generally to rear view mirrors for automotive vehicles and in particular to an adjustable supporting structure for a rear view mirror of pivoted side arm type adapted for use on trucks and the like.

A rear view mirror of pivoted side arm type now in common use on trucks includes a telescopically adjustable mirror arm pivoted at one end on a bracket having vertically spaced ears adapted to straddle the top hinge of a cab door. A hinge bolt is inserted through the spaced ears and the hinge members. The mirror is thus adjustable laterally of the car by adjustment of the telescopic mirror arm, and in up and down and horizontal directions by the complementary action of the bracket pivot and hinge bolt.

These rear view mirror structures are generally satisfactory in operation but have the objection that vibrations produced by road travel and engine operation are transmitted to the mirror such that the reflections of objects in the mirror are at times distorted beyond recognition. Another objection is found in the fact that as a result of vibration and the weight of the mirror at the free or outer end of the mirror supporting arm, the arm adjacent to its pivoted or inner end becomes weakened and frequently breaks.

It is an object of this invention, therefore, to provide an improved rear view mirror for a truck or the like.

Another object of this invention is to provide an adjustable supporting structure for a side arm rear view mirror which is adapted to yieldably support the mirror arm so as to substantially eliminate any vibrational movements of the mirror.

A further object of this invention is to provide an adjustable supporting structure for a side arm rear view mirror which is capable of being manipulated by a truck operator through the cab window, to laterally extend the mirror arm to a normal operating position, and to fold the arm upwardly to a position providing for the travel of the truck through a door or into a relatively confined parking place.

Still another object of this invention is to provide a supporting structure for a side arm rear view mirror which positively maintains the mirror arm in an adjusted position, is applicable to side arm mirror assemblies of varying sizes, and capable of being installed quickly and with a minimum of defacement to the truck body.

A feature of this invention is found in the provision of an adjustable supporting structure for a truck rear view mirror assembly of a pivoted side arm type in which a pair of telescoping brackets are pivotally connected at one of their ends with the mirror arm at positions spaced from its free end. The other ends of the brackets are yieldably and pivotally supported on the cab door at positions spaced, respectively, rearwardly and downwardly relative to the pivoted end of the mirror arm so that the mirror arm is positively braced against up and down and rearward and forward movement. With the brackets free for telescopic adjustment the mirror arm is readily movable to an adjusted position which is maintained by locking the brackets against telescopic movement, while the yieldable support of the brackets on the cab door absorbs any vibrational shocks transmitted to the mirror arm.

Further objects, features and advantages of this invention will become apparent from the following description when taken in connection with the accompanying drawings, in which:

Fig. 1 is a rear perspective view of the supporting structure of this invention shown in assembly relation on the cab door of a truck with a pivoted side arm rear view mirror;

Fig. 2 is a view illustrated similarly to Fig. 1 showing the supporting structure and mirror arm in upwardly folded or moved positions;

Fig. 3 is a plan view of the mirror arm and supporting structure assembly shown in Fig. 1;

Fig. 4 is an enlarged fragmentary detail perspective view of a yieldable support forming part of the supporting structure of this invention;

Fig. 5 is a view illustrated similarly to Fig. 4 and showing the yieldable support therein in a changed position; and Fig. 6 is an enlarged exploded perspective view of a clamp member which forms part of the supporting structure of this invention.

With reference to the drawings, the mirror supporting structure of this invention is illustrated in Figs. 1 and 2 in assembly relation with a usual pivoted side arm rear view mirror assembly, designated generally as 10, which includes a telescopically adjustable arm 11 having a telescoping section 12 and a locking screw 13 for holding the section 12 in an adjusted position. The inner end 14 of the arm 11 is pivotally connected at 16 with a bracket 17 integrally formed with a pair of vertically spaced ears 18 adapted to be arranged in a straddled relation about a hinge 19 for the door 21 of a truck cab (not shown). A hinge bolt 22 extends through the vertically spaced ears 18. A rear view mirror 23 is suitably carried at the outer or free end of the telescoping member 12.

It is seen, therefore, that the mirror 23 is positionable toward and away from the cab door 21 on movement of the telescoping member 12. Further, the arm 11 is adjustable in an up and down direction about the pivot 16, and in a horizontal, or forward and rearward direction, about the hinge bolt 22.

The supporting structure is comprised of a pair of like telescopically adjustable arms or brackets designated generally as 24 and 25 (Figs. 1 and 2). Since the brackets 24 and 25 are of a like construction and similarly assembled with the mirror arm 11 and cab door 21, only the bracket 25 will be described in detail, and similar numerals of reference will be applied to the corresponding like parts in the bracket 24.

The bracket 25 has a tubular telescoping member 26 of a flat construction at its outer end 27 (Figs. 1 and 3), which outer end is received between a pair of oppositely arranged straight ears or extensions 28 of a clamp or connecting member 29. The clamp 29 (Fig. 6) is comprised of two mating half sections 31 and 32, with the section 32 being formed with a bent lip or hook 33 which is receivable in hooked engagement within one of a plurality of openings 34 provided in the clamp section 31 to close the clamp. The selection of an opening 34 for the hook 33 is dependent upon the diameter of the arm 11 to be encompassed by the clamp. A clamping bolt 36 inserted through the ears 28 and the flat end 27 of the telescoping member 26, secures the clamp to the telescoping section 12 of the mirror arm 11 and pivotally connects the bracket 25 with the arm 11.

The tubular bracket section 37 is adapted to slidably receive the telescoping bracket section 26, with these two sections 26 and 37 being held against relative movement by a locking screw 38. The outer end 39 of the bracket section 37, is of a flat construction and pivoted at 41 with one end 42 of a flat spring steel member 43 (Figs. 3 and 4) which is arranged flat against the cab door 21 and has its opposite end 44 rigidly secured to the cab door as by metal screws 46. By virtue of the resilient characteristic of the spring member 43, the end 42 thereof is capable of a limited transverse twisting and yieldable movement relative to its secured end 44 for a purpose which will appear later.

As best appears in Figs. 1 and 2, the resilient member 43 for the bracket 25 is positioned horizontally, or in a direction longitudinally of the truck at a position spaced rearwardly from the door hinge 19. The resilient member 43 for the bracket 24 is arranged in an upright position at a spaced distance below the door hinge 19. As a result of this arrangement of the members 43, the supported ends of the mirror arm 11 and the brackets 24 and 25 on the cab door 21, define a substantially right angle triangle, as indicated at 45 by dotted lines in Fig. 1. It is seen, therefore, that the mirror arm 11 and brackets 24 and 25 constitute what might be termed a laterally extended tripod support for the mirror 23, with the bracket 25 being inclined inwardly and rearwardly from the mirror arm, and the bracket 24 inwardly and downwardly from the mirror arm.

In the use of the supporting structure of this invention, let it be assumed that the mirror 23 is to be adjusted to a normal operating position shown in Figs. 1 and 3. To accomplish this adjustment of the mirror 23, the lock screw 13 on the mirror arm 11, and the locking screws 38 for the brackets 24 and 25 are loosened, so that the arm and brackets are telescopically adjustable. As a result, the mirror 23 is freely movable toward and away from the cab door 21, and is capable of pivotal adjustment in both up and down and forward and rearward directions.

By virtue of the resilient support of the brackets 24 and 25 on the cab door 21, a pivotal movement of the arm 11 upwardly or downwardly out of a substantially horizontal plane is accommodated by a combined pivotal movement of the brackets about their pivots 41 and a transverse twisting movement of the ends 42 of their resilient or spring members 43 from positions, as illustrated for the bracket 25 in Fig. 4, to positions illustrated for the bracket 25 in Fig. 5. Thus the showings in Figs. 4 and 5 correspond to the positions of the bracket 25 in Figs. 1 and 2, respectively.

In a like manner, any pivotal movement of the mirror arm 11 about the hinge bolt 22 out of a plane substantially normal to the cab door 21, as illustrated in dotted lines in Fig. 3, is accommodated by a combined pivotal movement of the bracket 24 about its corresponding pivot 41 and a transverse twisting movement of the end 42 of its corresponding resilient member 43. The adjusted position of the mirror 23 is positively maintained by tightening the locking screws 13 and 38.

When the truck is to be driven through a garage door, or into a confined parking place, which is not sufficiently wide to accommodate the mirror 23 in its normal operating position, illustrated in Fig. 1, the supporting structure and the mirror arm 11 are readily moved to their upwardly extended or folded positions shown in Fig. 2, by loosening the locking screw 38 of the bracket 24 and moving the mirror arm 11 upwardly and inwardly. This folded position of the supporting structure is maintained by merely tightening the locking screw 38 on the bracket 24.

When the mirror 23 is to be returned to its normal operating position in Fig. 1, the locking screw 38 for the bracket 24 is loosened, and the mirror arm 11 moved downwardly until the mirror 23 is at a desired height. The screw 38 for the bracket 24 is then tightened. It will be appreciated, of course, that this manipulation of the mirror 23 from its normal operating position to its folded position is simply accomplished by the truck operator dropping the cab window 48 and then reaching outwardly therethrough for manipulation of the locking screw 38 and mirror arm 11. Further, it will be noted that in the movement of the supporting structure to its folded position, the resilient member 43 for the bracket 24, as shown in Fig. 2, tends to have its end 42 moved flat against the cab door 21 while the resilient member 43 for the bracket 25 tends to be transversely twisted to accommodate the movement of the bracket 25 outwardly from a substantially horizontal plane.

In the operation of the vehicle, the yieldable supports for the brackets 24 and 25 on the cab door 21, act as shock absorbers for the mirror arm 11 so as to substantially eliminate any vibrational movement in the arm 11. As a result, the mirror 23 is without vibrational movement so that objects viewed therein are readily and quickly recognizable. It is to be noted further that the support of the arm 11 against up and down and horizontal pivotal movement, at positions adjacent to the free end thereof, completely eliminates any leverage action of the dead weight of the mirror 23 on the free end of the arm, whereby weakening and possible breaking of the arm 11 adjacent to its pivot 16 is avoided.

From a consideration of the above description, it is seen that the invention provides a supporting structure for a truck rear view mirror of pivoted side arm type, which is of a simple and compact construction, fully adjustable to permit a free adjustment of the mirror arm in all directions and capable of positively maintaining the mirror arm in an adjusted position. The supporting structure positively supports the mirror arm adjacent to its free end, and by virtue of the resilient members 43 absorbs all vibrational movement in the arm 11 so that the mirror 23 is substantially stationary at all times. Further, after an initial adjustment of the supporting structure, it is readily movable into and out of an upwardly extended or folded position therefor, by the manipulation of a single locking screw which is readily accessible through the window of the cab door.

Although the invention has been described and illustrated with respect to a preferred embodiment thereof, it is to be understood that it is not to be so limited since changes can be made therein which are within the full intended scope of this invention as defined by the appended claims.

I claim:

1. A supporting structure for a vehicle rear vision mirror assembly having a supporting arm pivoted at one end on a side of the vehicle, said structure comprising a pair of telescopically adjustable brackets having one of their ends movably connected with said supporting arm at positions adjacent to said mirror, and their opposite ends movably supported on said vehicle side, with one of said brackets being inclined downwardly and inwardly from said arm with its supported end vertically spaced from the pivoted end of said supporting arm, and the other of said brackets being extended inwardly and rearwardly from said arm with its supported end horizontally spaced from the pivoted end of said supporting arm, and means for holding said brackets in telescopically adjusted positions to hold said mirror arm in an adjusted position.

2. A supporting structure for a vehicle rear vision mirror assembly having a mirror mounted at the free end of a pivotally adjustable arm supported for up and down and horizontal pivotal movement on a side of the vehicle, said structure comprising a pair of adjustable telescoping brackets having one of their ends pivotally connected with said mirror arm at positions adjacent to the free end thereof, means yieldably and movably supporting the other ends of said brackets on said vehicle side including resilient members fixedly secured at one of their ends on said vehicle side, means pivotally connecting the opposite ends of said resilient members with the other ends of said brackets, with one of said supporting means being spaced rearwardly from, and the other of said supporting means being spaced downwardly from, the pivoted end of said mirror arm, and means for locking said brackets against telescopic movement to hold said mirror arm in an adjusted position.

3. A supporting structure for a vehicle rear vision mirror assembly having a mirror carried at the free end of a pivotally adjustable arm supported for up and down and horizontal pivotal movement on a side of the vehicle, said structure comprising a pair of adjustable telescoping brackets, means pivotally connecting one of the ends of said brackets with said mirror arm at positions adjacent to the free end thereof, means corresponding to said brackets for yieldably and pivotally supporting the opposite ends of said brackets on said vehicle side including flat resilient members having one of their ends fixed on said vehicle side, with one of said resilient members being spaced rearwardly from the supported end of said mirror arm and extended in a direction longitudinally of the vehicle with its secured end rearward, and the other of said resilient members being spaced downwardly from the supported end of said mirror arm and extended in an upright direction with its secured end downward, means pivotally connecting the other ends of said resilient members with the opposite ends of said brackets, and means for locking said brackets against telescopic movement to hold said mirror arm in an adjusted position.

4. A supporting structure for a vehicle rear vision mirror assembly having a mirror mounted at the free end of a pivotally adjustable arm supported for up and down and horizontal pivotal movement on the side of a vehicle, said structure including a pair of adjustable telescoping brackets, separate means for locking said brackets against telescopic adjustment to hold said mirror arm in an adjusted position, means movably connecting said brackets at one of their ends with said arm at positions adjacent to the free end of said arms, and means movably supporting the other ends of said brackets on said vehicle side such that the other end of one of said brackets is spaced rearwardly from the supported end of said mirror arm, and the other end of the second one of said brackets is spaced downwardly from the supported end of said mirror arm, whereby the mirror arm and either one of said brackets in a fixed adjusted position are movable as a unit when the remaining one of said brackets is free for telescopic movement.

THOMAS THOMPSON.

REFERENCES CITED

The following references are of record in the file of this patent:

UNITED STATES PATENTS

| Number | Name | Date |
| --- | --- | --- |
| 902,635 | Wowra | Nov. 3, 1908 |
| 1,542,548 | Gordon | June 16, 1925 |
| 2,134,016 | Zink | Oct. 25, 1938 |
| 2,176,723 | Sauer | Oct. 17, 1939 |